United States Patent [19]

Takamura et al.

[11] Patent Number: 4,651,268
[45] Date of Patent: Mar. 17, 1987

[54] MULTIPLE STEP-UP RECTIFIER CIRCUIT

[75] Inventors: Yoshio Takamura, Yokohama; Akira Nakajima, Yokosuka, both of Japan

[73] Assignee: Tokyo Shibaura Denki Kabushiki Kaisha, Kawasaki, Japan

[21] Appl. No.: 543,962

[22] Filed: Oct. 20, 1983

[30] Foreign Application Priority Data

Oct. 22, 1982 [JP] Japan .................................. 57-185713

[51] Int. Cl.$^4$ .............................................. H02M 7/19
[52] U.S. Cl. ........................................ 363/60; 363/126
[58] Field of Search ...................... 363/59, 60, 61, 126

[56] References Cited

U.S. PATENT DOCUMENTS 2,619,602 11/1952 Walker et al. .
4,437,147 3/1984 Takamura .............................. 363/61

FOREIGN PATENT DOCUMENTS 491526 7/1970 Switzerland .

OTHER PUBLICATIONS

Scoles, Graham J.; Multi-Stage Voltage-Multiplying Circuits; Ellis Howarth Ltd., 1980, pp. 158-170.

Primary Examiner—Peter S. Wong
Assistant Examiner—Judson H. Jones
Attorney, Agent, or Firm—Cushman, Darby & Cushman

[57] ABSTRACT

A multiple step-up rectifier circuit has a transformer, diodes connected in series with each other, and first, second, third and fourth capacitors. An AC signal source is connected to a primary winding of the transformer. A neutral point of a secondary winding of the transformer is grounded. One terminal of a series circuit of the diodes is connected to the neutral point such that the diodes are biased in the same direction. The first capacitor is connected across the two terminals of a series circuit of the diodes. The second capacitor is connected to a first output terminal of the secondary winding of the transformer and the common connecting point of a first pair of diodes. The third capacitor is connected between a second output terminal of the second winding of the transformer and the common connecting point of a second pair of diodes. The fourth capacitor is connected between a third output terminal of the secondary winding of the transformer and the common connecting point of a third pair of diodes.

5 Claims, 6 Drawing Figures

F I G. 1
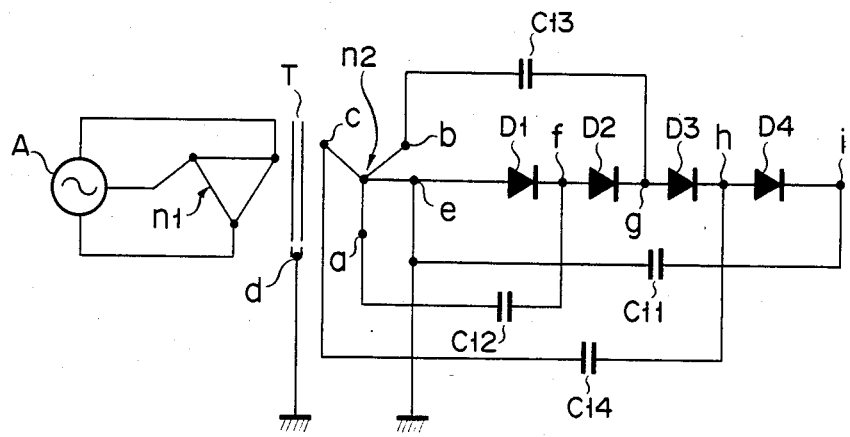
F I G. 2
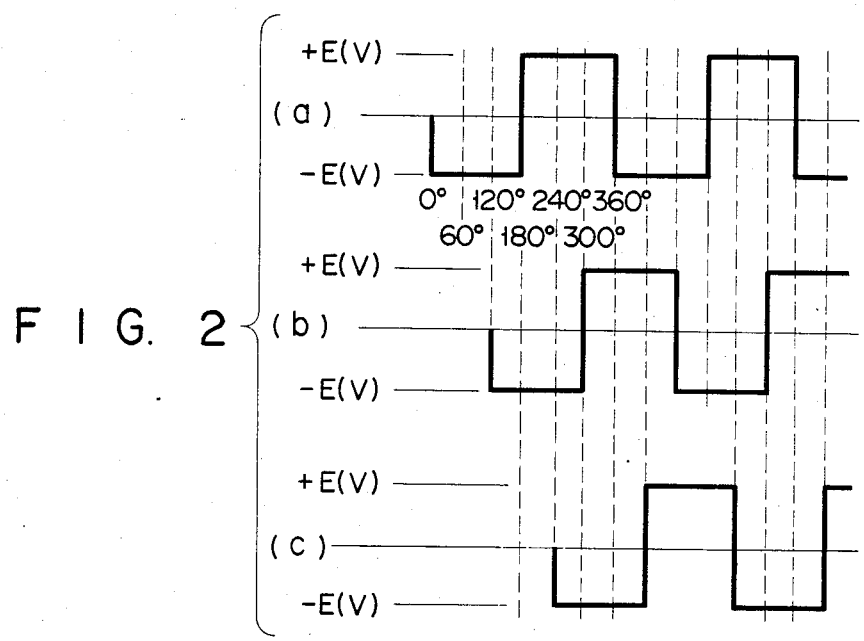

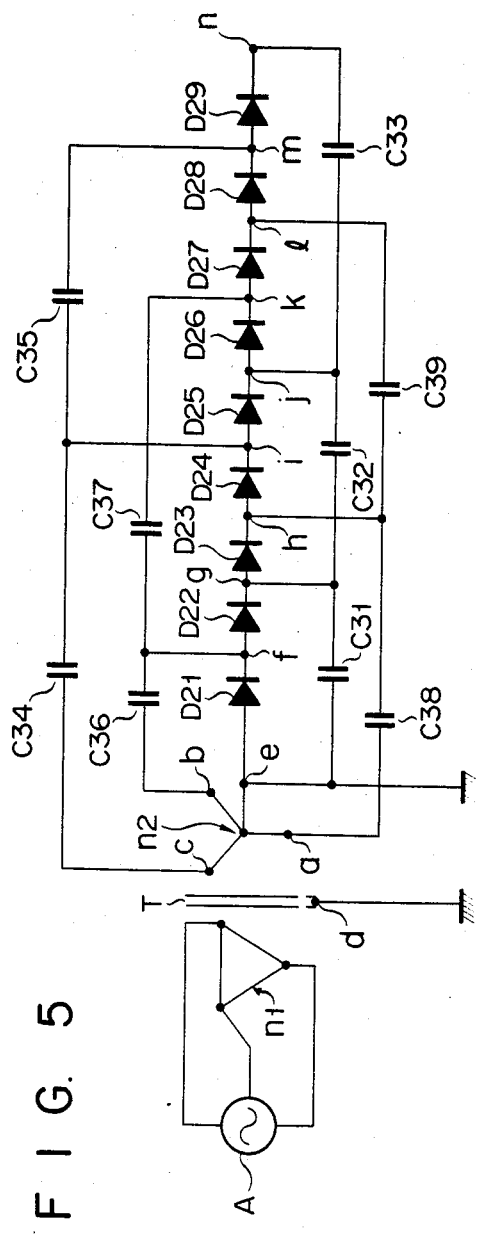
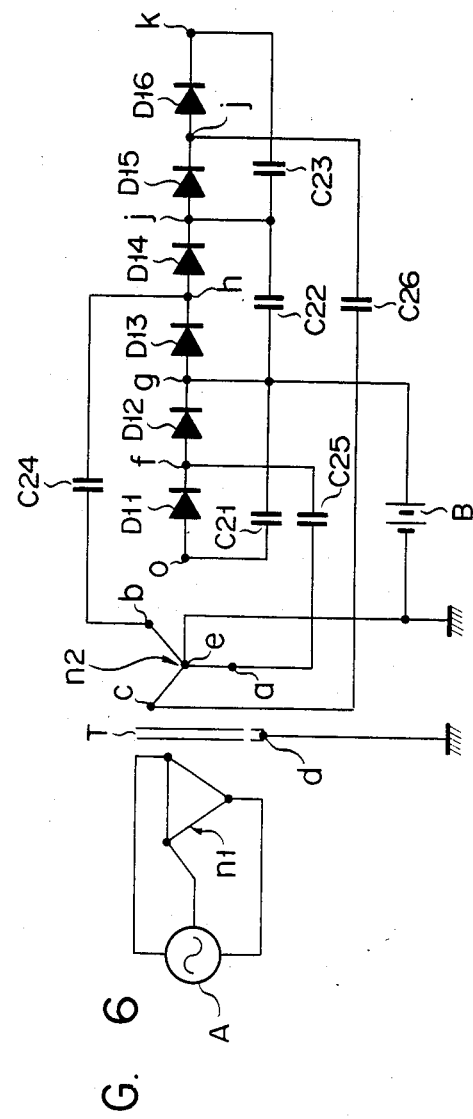
FIG. 5
FIG. 6

MULTIPLE STEP-UP RECTIFIER CIRCUIT

BACKGROUND OF THE INVENTION

The present invention relates to a polyphase AC multiple step-up rectifier circuit for rectifying an output voltage from a secondary winding of a transformer and obtaining a high voltage by using a combination of capacitors and diodes.

Several conventional multiple step-up rectifier circuits have been proposed. However, these circuits serve to provide a DC high voltage from a single phase AC voltage. None of these can provide a DC high voltage from a polyphase AC voltage.

A great advantage can be obtained by minimizing the dielectric withstand voltage between the primary and secondary windings of the transformer of a high-voltage generating apparatus of this type. In particular, a small AC dielectric withstand voltage allows a decrease in corona discharge, which discharge shortens the service life of the transformer. Therefore, great efforts have been made by circuit designers and manufacturers to decrease the AC dielectric withstand voltage described above. Corona discharge is not decreased only by means of the physical characteristics of insulators, but also by slight changes in the manufacturing process. For this reason, it is very important to develop a technique for decreasing the above-mentioned dielectric withstand voltage from the viewpoint of industrial application. From another viewpoint, the high-voltage generating apparatus has conventionally been made compact by decreasing the size of a transformer and related component parts in a high frequency arrangement. However, an insulation gap for the dielectric withstand voltage between the input and output terminals is determined independently of the frequency. When a high-voltage generating apparatus is operated at a higher frequency (i.e., the size is further decreased), the insulation gap is increased, thereby preventing the production of a compact apparatus.

SUMMARY OF THE INVENTION

It is an object of the present invention to provide a multiple step-up rectifier circuit having a relatively simple construction and a small number of component parts, wherein a polyphase AC voltage is transformed into a DC high voltage by a transformer having a relatively low dielectric withstand voltage between the primary and secondary windings thereof.

In order to achieve the above object of the present invention, a multiple step-up rectifier circuit is provided comprising:

transformer means having a primary winding connected to a polyphase AC signal source and a secondary winding, said secondary winding being provided with a plurality of output terminals which have phase difference $\theta$ with respect to a predetermined potential point, where $0 < \theta < 180°$;

a series circuit including a plurality of rectifying means connected in series so as to be biased in the same direction;

at least one first capacitor means connected between two terminals of said series circuit; and at least second, third and fourth capacitor means each of which has one end connected to a corresponding one of said output terminals of said secondary winding and the other end connected to a corresponding one of first, second and third connecting points of said rectifying means.

BRIEF DESCRIPTION OF THE DRAWINGS

FIG. 1 is a circuit diagram showing a multiple step-up rectifier circuit according to a first embodiment of the present invention;

FIGS. 2(a) to 2(c) show a timing chart of three-phase rectangular output signals from a transformer;

FIG. 5 is a circuit diagram showing a multiple step-up rectifier circuit according to a third embodiment; and FIG. 6 is a circuit diagram showing a multiple step-up rectifier circuit according to a fourth embodiment.

DETAILED DESCRIPTION OF THE PREFERRED EMBODIMENTS

Figure 3:
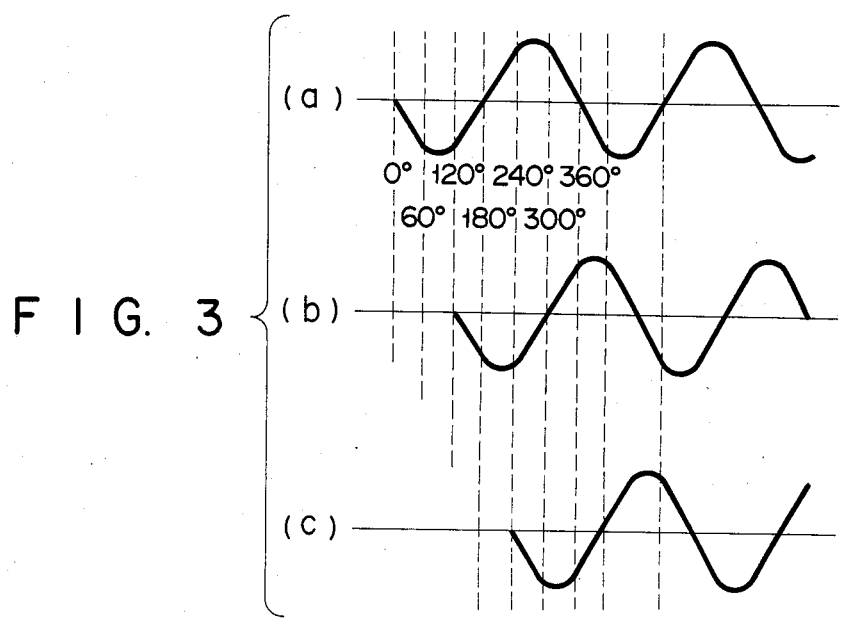
FIGS. 3(a) to 3(c) show a timing chart of three-phase sinusoidal output signals from the transformer.

A multiple step up rectifier circuit according to a first embodiment will be described with reference to the accompanying drawings.

Referring to FIG. 1, a primary winding n1 of a three-phase transformer T is delta-connected, and a secondary winding n2 is Y-connected. A three-phase AC signal source A is connected to the primary winding n1 of the transformer T. A core d of the transformer T and a neutral point e of the secondary winding n2 are grounded. Diodes D1 to D4 are series-connected between the neutral point e and a connecting point i such that they are biased in the same direction. More particularly, the anode of the diode D1 is connected to the neutral point e and the cathode of the diode D4 is connected to the connecting point i. A capacitor C11 is connected in parallel between the two terminals of the series circuit having the diodes D1 to D4 (i.e., between the anode of the diode D1 and the cathode of the diode D4). One terminal of respective capacitors C12, C13 and C14 is connected to a corresponding one of output terminals a, b and c of the secondary winding n2 of the transformer T. The output terminals a, b and c correspond to different phases, respectively. The other terminal of each of the capacitors C12, C13 and C14 is connected to a corresponding one of connecting points f, g and h between the diodes D1 and D2, between the diodes D2 and D3 and between the diodes D3 and D4, respectively. More particularly, the other terminal of the capacitor C12 is connected to the connecting point f between the diodes D1 and D2. The other terminal of the capacitor C13 is connected to the connecting point g between the diodes D2 and D3. Similarly, the other terminal of the capacitor C14 is connected to the connecting point h between the diodes D3 and D4.

The operation of the multiple step up rectifier circuit having the above-mentioned arrangement will now be described. For illustrative convenience, assume that three-phase rectangular power having three phases displaced by 120° as shown in FIGS. 2(a) to 2(c) is applied to the primary winding n1 of the transformer T, and that rectangular voltages of $\pm E$ V having 120° phase difference ($\theta$) from each other appear at the output terminals a, b and c of the secondary winding n2, respectively.

When a voltage of $-E$ V appears at the output terminal a of the secondary winding n2, the capacitor C12 is charged to a voltage of E V through the diode D1. In this case, the connecting point f is set at a positive potential with respect to the capacitor C12. Assume that a voltage of −E V having a phase difference of 120° with respect to the voltage at the output terminal a appears at the output terminal b of the secondary winding n2, as shown in FIG. 2(b). In this case, the output terminals a and b are set at the same potential during the first 60° phase (i.e., 120° to 180°). However, during the next 120° phase (i.e., 180° to 300°), the output terminal a is set at a voltage of E V, and the output terminal b is set at a voltage of −E V. The capacitor C13 is charged through the diode D2 to a voltage of 3E V corresponding to a sum of the voltage of E V at the output terminal a, the voltage of +E V charged on the capacitor C12, and the voltage of −E V at the output terminal b of the transformer T. In this case, the connecting point g is set at a positive potential with respect to the capacitor C13. Then assume that a voltage of −E V having a 120° phase difference with respect to the voltage at the output terminal b appears at the output terminal c of the secondary winding n2 in the same manner as in the output terminal b, as shown in FIG. 2(c). The output terminals b and c are kept at the same voltage of −E V during the first 60° phase (i.e., 240° to 300°). However, during the following 120° phase (i.e., 300° to 420°), the output terminal b is set at a voltage of E V, the output terminal c is set at a voltage of −E V, and the capacitor C14 is charged through the diode D3 to a voltage of 5E corresponding to a sum of the voltage of E V at the output terminal b of the secondary winding n2, the voltage of 3E V charged on the capacitor C13, and the voltage of −E V at the output terminal c of the secondary winding n2. In this case, the connecting point h is kept at a positive potential with respect to the capacitor C14. When the phase is set at 420°, the output terminal c of the secondary winding n2 is set at a voltage of E V. Therefore, the capacitor C11 is charged through the diode D4 to a voltage of 6E V comprising a sum of the voltage of E V at the output terminal c of the secondary winding n2 and the voltage of 5E V charged on the capacitor C14. In this case, the connecting point i is set at a positive potential with respect to the capacitor C11.

When the phase is set at 360°, the output terminal a of the secondary winding n2 is set at a voltage of −E V again, and the capacitor C12 is charged to a voltage of E V again. As the phase advances, the above operation is repeated. The connecting point i is stably held at the voltage of 6E V.

According to the multiple step up rectifier circuit of the first embodiment, the following effects can be obtained. Although the input/output voltage of each phase applied to the transformer T is set at a maximum of E V, when a combination of four diodes D1 to D4 and the capacitors C11 to C14 are utilized, an output voltage of 6E V can be obtained. This indicates that only a small dielectric withstand voltage between the input and output terminals (i.e., between the primary and secondary windings n1 and n2) is required by the transformer T to generate a predetermined output voltage. In this manner, the dielectric withstand voltage and the corona discharge can be minimized, thereby prolonging the service life of the transformer T.

Furthermore, since the dielectric withstand voltage between the primary and secondary windings n1 and n2 is low, a compact transformer can be obtained.

In the first embodiment, the input waveform is a rectangular wave. However, a sinusoidal wave can be used in the manner to be described below to obtain the same effects as in the first embodiment.

When a sinusoidal wave input is applied to the transformer of the first embodiment, the voltage waveforms at the output terminals a, b and c of the secondary winding n2 of the transformer T are shown in FIGS. 3(a) to 3(c), respectively. The capacitor C12 is charged to a voltage of E V, and the capacitors C13 and C14 respectively connected to the output terminals b and c are charged in the following manner. The capacitor C13 is charged to a voltage of 2.72E V as a sum of the voltage of E V charged on the capacitor C12 and the maximum (i.e., 0.86×2E V) voltage difference between the output terminals a and b of the secondary winding n2. The capacitor C14 is charged to a voltage of 4.44E V as a sum of the voltage of 0.86×2E V charged on the capacitor C13 and the maximum (i.e., 0.86×2E V) voltage difference between the output terminals b and c. The capacitor C11 is charged to a voltage of 5.44E V as a sum of the voltage of 4.44E V charged on the capacitor C14 and a voltage of E V at the output terminal c of the secondary winding n2. Therefore, the output voltage of the rectifier circuit is 5.44E V, comprising about 90% of the output voltage of 6E V obtained when the rectangular wave input is applied. The dielectric withstand voltage between the input and output terminals which is required by the transformer T is increased by only about 10%. As a result, even if a sinusoidal wave input is used in place of a rectangular wave input, the effect of the first embodiment is not substantially decreased.

A multiple step-up rectifier circuit according to a second embodiment of the present invention will be described with reference to FIG. 4. The same reference numerals as used in FIG. 1 denote the same parts in FIG. 4.

Figure 4:
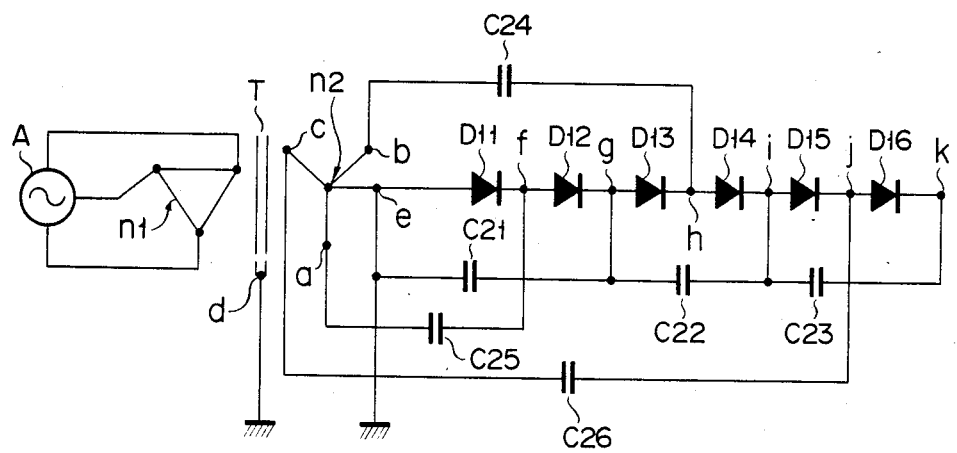
FIG. 4 is a circuit diagram showing a multiple step-up rectifier circuit according to a second embodiment.

Referring to FIG. 4, a plurality of series-connected diodes (i.e., diodes D11 to D16) are connected between a neutral point e of a secondary winding n2 of a transformer T and a connecting point k such that the diodes D11 to D16 are biased in the same direction. More particularly, the neutral point e is connected to the anode of the diode D11, and the connecting point k is connected to the cathode of the diode D16. Series-connected capacitors C21, C22 and C23 are connected in parallel between two terminals of a series circuit having the diodes D11 to D16 (i.e., between the anode of the diode D11 and the cathode of the diode D16). A connecting point between the capacitors C21 and C22 is connected to a connecting point g between the diodes D12 and D13. A connecting point between the capacitors C22 and C23 is connected to a connecting point i between the diodes D14 and D15. One terminal of each of capacitors C25, C24 and C26 is connected to a corresponding one of output terminals a, b and c of the secondary winding n2. The other terminal of the capacitor C25 is connected to a connecting point f between the diodes D11 and D12. The other terminal of the capacitor C24 is connected to a connecting point h between the diodes D13 and D14. The other terminal of the capacitor C26 is connected to a connecting point j between the diodes D15 and D16.

The operation of the multiple step up rectifier circuit having the above-mentioned arrangement will now be described. The rectangular wave input shown in FIGS. 2(a) to 2(c) is supplied to the transformer T.

Assume that a voltage of −E V appears at the output terminal a of the secondary winding n2 when the phase is set at 0°, as shown in FIG. 2(a). In this case, the diode D11 is turned on or rendered conductive, so that a current flows through the neutral point e, the diode D11, the connecting point f, the capacitor C25 and the output terminal a. As a result, the capacitor C25 is charged to a voltage of E V, and the connecting point f is set at a positive potential with respect to the capacitor C25. When the phase is shifted 180°, as shown in FIGS. 2(a) and 2(b), a voltage of E V appears at the output terminal a of the secondary winding n2, and a voltage of −E V appears at the output terminal b. In this case, the diodes D12 and D13 are turned on, so that a current flows through the connecting point f, the diode D12, the connecting point g, the capacitor C21, the neutral point e, the output terminal a (E V), and the capacitor C25 (E V). Therefore, the capacitor C21 is charged to a voltage of 2E V. Similarly, a current flows through the connecting point f, the diode D12, the connecting point g, the diode D13, the connecting point h, the capacitor C24, the output terminal b (E V), the neutral point e, the output terminal a (E V) and the capacitor C25 (E V). The capacitor C24 is charged to a voltage of 3E V. In this case, the connecting point g is set at a positive potential with respect to the capacitor C21, and the connecting point h is set at a positive potential with respect to the capacitor C24. When the phase advances to 300°, as shown in FIGS. 2(a) to 2(c), voltages of E V appear at the output terminals a and b of the secondary winding n2, respectively, and a voltage of −E V appears at the output terminal c. In this case, the diodes D14 and D15 are turned on, so that a current flows through the connecting point h, the diode D14, the connecting point i, the capacitor C22, the capacitor C21 (−2E V), the neutral point e, the output terminal b (E V) and the capacitor C24 (3E V). The capacitor C22 is then charged to a voltage of 2E V. A current flows through the connecting point h, the diode D14, the connecting point i, the diode D15, the connecting point j, the capacitor C26, the output terminal c (E V), the neutral point e, the output terminal b (E V) and the capacitor C24 (3E V), so that the capacitor C26 is charged to a voltage of 5E V. In this case, the connecting point i is set at a positive potential with respect to the capacitor C22, and the connecting point j is set at a positive potential with respect to the capacitor C26. When the phase is shifted to 360°, as shown in FIGS. 2(a) to 2(c), voltages of −E V appear at the output terminals a and c, respectively, and a voltage of E V appears at the output terminal b. In this case, the capacitor C25 is charged to a voltage of E V in the same manner as previously described. Furthermore, when the phase is shifted to 420°, as shown in FIGS. 2(a) to 2(c), a voltage of −E V appears at the output terminal a, and voltages of E V respectively appear at the output terminals b and c. In this case, the diode D16 is turned on, so that a current flows through the connecting point j, the diode D16, the connecting point k, the capacitors C23, C22 (−2E V) and C21 (−2E V), the neutral point e, the output terminal c (E V) and the capacitor C26 (5E V). The capacitor C23 is charged to a voltage of 2E V. In this case, the connecting point k is set at a positive potential with respect to the capacitor C23.

A description will now be made with reference to a case wherein a sinusoidal wave input is used in place of the rectangular wave input in the multiple step-up rectifier circuit of the second embodiment.

The capacitor C25 is charged to a voltage of 2E V in units of periods when the above-mentioned operation is performed. In the same manner, the capacitor C21 is charged to a voltage of 2E V. A voltage of 2E V appears across the neutral point e and the connecting point g such that the connecting point g is set at a positive potential. For every period, the capacitor C24 is charged to the maximum voltage difference between the voltage applied across the neutral point e and the connecting point g and the voltage applied across the neutral point e and the output terminal b. Therefore, the capacitor C24 is charged to a voltage of 3E V, and the connecting point h is set at a positive potential with respect to the capacitor C24. A voltage of 4E V as a sum of the voltage charged on the capacitor C24 and the maximum voltage applied across the neutral point e and the output terminal b is applied between the neutral point e and the connecting point i for every period. For this reason, the capacitor C22 is charged to a voltage of 2E V as a difference between the voltage applied across the neutral point e and the connecting point i and the voltage charged on the capacitor C21. Similarly, for every period, the maximum voltage difference between the voltage applied across the neutral point e and the connecting point i and the voltage applied across the neutral point e and the output terminal c is applied across the capacitor C26. The capacitor C26 is thus charged to a voltage of 5E V, and the connecting point j is set at a positive potential with respect to the capacitor C26. A voltage of 6E V as a sum of the voltage charged on the capacitor C26 and a voltage applied across the neutral point e and the output terminal c is applied between the neutral point e and the connecting point k for every period. The capacitor C23 is charged to a voltage of 2E V as a difference between the voltage of 6E V and the voltage applied between the capacitors C21 and C22.

The same effect as in the first embodiment can be obtained by the second embodiment described above. The capacitors C21, C22 and C23 are connected in parallel with a series circuit of the diodes D11 and D12, a series circuit of the diodes D13 and D14, and a series circuit of the diodes D15 and D16, respectively. Each of the connecting points f, h and j between the diodes D11 and D12, between the diodes D13 and D14, and between the diodes D15 and D16, respectively, is connected to the other terminal of a corresponding one of the capacitors C25, C24 and C26 each having one end connected to a corresponding one of the output terminals a, b and c of the secondary winding n2. Therefore, the capacitors C21, C22 and C23 are charged to voltages of 2E V, respectively, so that the output voltage of 6E V can be obtained irrespective of the rectangular and sinusoidal wave inputs.

The required dielectric withstand voltage of each of the capacitors C21, C22 and C23 is ⅓ that of the capacitor C11 (FIG. 1). If the capacitance of each of the capacitors C21, C22 and C23 is equal to that of the capacitor C11, a capacitance product or a voltage product is decreased to ⅓.

According to an experiment for operation analysis, it is found that the voltage drop and ripple voltage of the circuit of the second embodiment are at most 40% and 80% over those of the circuit of the first embodiment, when the same load current flows in the circuits of the first and second embodiments. The electrical characteristics of the circuit of the second embodiment are better than those of the circuit of the first embodiment. In the second embodiment, the connecting points g and i between the capacitors C21 and C22 and between the capacitors C22 and C23 can be used as the output terminals.

A multiple step up rectifier circuit according to a third embodiment of the present invention will be described with reference to FIG. 5. The same reference numerals as used in FIGS. 1 and 4 denote the same parts in FIG. 5.

This multiple step-up rectifier circuit has an arrangement wherein series-connected capacitors are connected to output terminals a, b and c of the secondary winding n2 of the transformer T. Referring to FIG. 5, series-connected diodes D21 to D29 are connected between a neutral point e of the secondary winding n2 of the transformer T and a connecting point n such that the diodes D21 and D29 are biased in the same direction. The anode of the diode D21 is connected to the neutral point e, and the cathode of the diode D29 is connected to the connecting point n. Series-connected capacitors C31, C32 and C33 are connected in parallel with the two terminals of the series circuit of the diodes D21 to D29 (i.e., with the anode of the diode D21 and the cathode of the diode D29). A connecting point between the capacitors C31 and C32 is connected to a connecting point g between the diodes D22 and D23. A connecting point between the capacitors C32 and C33 is connected to a connecting point j between the diodes D25 and D26. A series circuit of capacitors C34 and C35 is connected between the output terminal c of the secondary winding n2 and a connecting point m between the diodes D28 and D29. A connecting point between the capacitors C34 and C35 is connected to a connecting point i between the diodes D24 and D25. A series circuit of capacitors C36 and C37 is connected between the output terminal b of the secondary winding n2 and a connecting point k between the diodes D26 and D27. A connecting point between the capacitors C36 and C37 is connected to a connecting point f between the diodes D21 and D22. A series circuit of capacitors C38 and C39 is connected between the output terminal a of the secondary winding n2 and a connecting point l between the diodes D27 and D28. A connecting point between the capacitors C38 and C39 is connected to a connecting point h between the diodes D23 and D24.

The operation of the multiple step-up rectifier circuit according to the third embodiment of the present invention having the above-mentioned arrangement will be described hereinafter. A description will be made with reference to a case wherein a rectangular wave input shown in FIGS. 2(a) to 2(c) is supplied to the transformer T.

In the circuit of the third embodiment, the order of connection of the capacitors with respect to the output terminals a, b and c of the secondary winding n2 is different from those of the first and second embodiments. Steady operation can be obtained in the circuit of the third embodiment one period after that of the circuits of the first and second embodiments is obtained. For the sake of simplicity, a description will be made when several periods have elapsed.

When the output terminal b is set at a voltage of $-E$ V, the diode D21 is turned on, so that a current flows through the neutral point e, the diode D21, the connecting point f, the capacitor C36 and the output terminal b. The capacitor C36 is charged to a voltage of E V. In this case, the connecting point f is set at a positive potential with respect to the capacitor C36. When the output terminal b is then set at a voltage of E V, the diode D22 is turned on, so that a current flows through the output terminal b (E V), the capacitor C36 (E V), the connecting point f, the diode D22, the connecting point g, the capacitor C31 and the neutral point e. The capacitor C31 is charged to a voltage of 2E V. In this case, the connecting point g is set at a positive potential with respect to the capacitor C31. Therefore, the voltage of 2E V always appears at the connecting point g with respect to ground. When the output terminal a is set at a voltage of $-E$ V, the diode D23 is turned on, so that a current flows through the neutral point e, the capacitor C31 (2E V), the connecting point g, the diode D23, the connecting point h, the capacitor C38, and the output terminal a. The capacitor C38 is charged to a voltage of 3E V. In this case, the connecting point h is set at a positive potential with respect to the capacitor C38. Furthermore, when the output terminal a is set at the voltage of E V, a voltage of $-E$ V appears at the output terminal c, as shown in FIGS. 2(a) to 2(c). In this case, the diode D24 is turned on, so that a current flows through the output terminal a (E V), the capacitor C38 (3E V), the connecting point h, the diode D24, the connecting point i, the capacitor C34, the output terminal c (E V) and the neutral point e. The capacitor C34 is then charged to a voltage of 5E V. In this case, the connecting point i is set at a positive potential with respect to the capacitor C34. When the output terminal c is set at a voltage of E V, the diode D25 is turned on, so that a current flows through the output terminal c (E V), the capacitor C34 (5E V), the connecting point i, the diode D25, the connecting point j, the capacitor C32, the capacitor C31 ($-2E$ V) and the neutral point e. The capacitor C32 is then charged to a voltage of 4E V. In this case, the connecting point j is set at a positive potential with respect to the capacitor C32. The voltage of 2E V charged on the capacitor C31 is applied to the connecting point j, so that a voltage of 6E V appears at the connecting point j. At the same time, when the output terminal c is set at the voltage of E V, the output terminal b is set at a voltage of $-E$ V. In this case, the diodes D25 and D26 are turned on, so that a current flows through the output terminal c (E V), the capacitor C34 (5E V), the connecting point i, the diode D25, the connecting point j, the diode D26, the connecting point k, the capacitor C37, the capacitor C36 ($-E$ V), the output terminal b (E V), and the neutral point e. The capacitor C37 is then charged to a voltage of 6E V. In this case, the connecting point k is set at a positive potential with respect to the capacitor C37. Subsequently, when the output terminal b is set at a voltage of E V, the capacitor C31 is kept at a voltage of 2E V in the same manner as previously described. When the output terminal b is set at a voltage of E V and at the same time the output terminal a is set at a voltage of $-E$ V, the diode D27 is turned on, so that a current flows through the output terminal b (E V), the capacitor C36 (E V), the capacitor C37 (6E V), the connecting point k, the diode D27, the connecting point l, the capacitor C39, the capacitor C38 ($-3E$ V), the output terminal a (E V) and the neutral point e. The capacitor C39 is then charged to a voltage of 6E V. In this case, the connecting point l is set at a positive potential with respect to the capacitor C39. Subsequently, when the output terminal a is set at a voltage of E V and at the same time the output terminal c is set at a voltage of $-E$ V, the capacitor C34 is kept at a voltage of 5E V. At the same time, the diode D28 is turned on, so that a current flows through the output terminal a (E V), the capacitor C38 (3E V), the capacitor C39 (6E V), the connecting point l, the diode D28, the connecting point m, the capacitor C35, the capacitor C34 (−5E V), the output terminal c (E V) and the neutral point e. The capacitor C35 is then charged to a voltage of 6E V. In this case, the connecting point m is set at a positive terminal with respect to the capacitor C35. Thereafter, when the output terminal c is set at a voltage of E V, the diode D29 is turned on, so that a current flows through the output terminal c (E V), the capacitor C34 (5E V), the capacitor C35 (6E V), the connecting point m, the diode D29, the connecting point n, the capacitor C33, the capacitor C32 (−4E V), the capacitor C31 (−2E V) and the neutral point e. The capacitor C33 is then charged to a voltage of 6E V. In this case, the connecting point n is set at a positive potential with respect to the capacitor C33. At the same time, the voltages charged on the capacitors C31, C32 and C33 are applied to the connecting point n, so that a voltage of 12E V with reference to ground appears at the connecting point n.

A description will now be made with reference to a case wherein a sinusoidal wave input as shown in FIG. 3 is applied to the transformer of the circuit according to the third embodiment.

When the three-phase sinusoidal wave input is applied, there exists a capacitor which is not charged to a voltage an integer multiple of the input voltage. The capacitor C36 is charged to the maximum (E V) voltage appearing at the output terminal b, and the capacitor C31 is charged to the maximum (2E V) voltage difference between the neutral point e and the connecting point f. The connecting point g is set at a voltage of 2E V with reference to ground in the same manner as previously described. The maximum (3E V) voltage difference between the connecting point g and the output terminal a is also applied to the capacitor C38. The capacitor C34 is charged to a voltage comprising a sum of the voltage on the capacitor C38 and the maximum voltage difference between the output terminals c and a. For this reason, when the sinusoidal wave input is used, since the maximum potential difference between the output terminals c and a is about $0.86 \times 2E$ V, the capacitor is charged to a voltage of $(3+2\times0.86)E$ V. The capacitor C32 is charged to a voltage of $(2+2\times0.86)E$ V. The connecting point j is set at a voltage of $(4+2\times0.86)E$ V with respect to ground. The capacitor C37 is charged to the maximum voltage difference between the voltage across the neutral point e and the connecting point j and the voltage across the neutral point e and the connecting point f. The capacitor C37 is then charged to a voltage of $(4+2\times0.86)E$ V. The capacitor C39 is charged to a sum of the maximum voltage difference between the output terminal b and a and a voltage of $(2+2\times0.86)E$ V. It should be noted that the voltage of $(2+2\times0.86)E$ V is obtained by subtracting the voltage of 3E V charged on the capacitor C38 from a sum of the voltage of E V charged on the capacitor C36 and the voltage of $(4+2\times0.86)E$ V charged on the capacitor C37. Therefore, the capacitor C39 is charged to a voltage of $(2+4\times0.86)E$ V. Similarly, the capacitor C35 is charged to a sum of the maximum voltage difference between the output terminals a and c and a voltage obtained such that a voltage of $(3+2\times0.86)E$ V charged on the capacitor C34 is subtracted from a sum (i.e., $(5+4\times0.86)E$ V) of the voltages charged on the capacitors C38 and C39. Therefore, the capacitor C35 is charged to a voltage of $(2+4\times0.86)E$ V. The capacitor C33 is charged to a voltage of $(2+4\times0.86)E$ V. This voltage is obtained by subtracting a sum (i.e., $(4+2\times0.86)E$ V) of the voltages charged on the capacitors C31 and C32 from a sum (i.e., $(6+6\times0.86)E$ V) of the voltages charged on the capacitors C34 and C35. Therefore, the connecting point n is set at a voltage of $(6+6\times0.86)E$ V with reference to ground.

According to the third embodiment, when the rectangular wave input is used, voltages of 2E, 6E and 12E V appear at the connecting points g, j and n, respectively. In the same manner as in the first and second embodiments, a high voltage can be obtained by the third embodiment using a transformer which has a low dielectric withstand voltage between the input and output terminals.

According to the same circuit arrangement as in the third embodiment, the step-up ratio of the voltage can be increased to six times the output voltage from the transformer by a combination of capacitors having a maximum dielectric withstand voltage of 6E V. Therefore, the arrangement described above is suitable for a variety of industrial applications.

A multiple step-up rectifier circuit according to a fourth embodiment of the present invention will now be described with reference to FIG. 6. The circuit shown in FIG. 6 resembles that shown in FIG. 2. The same reference numerals as used in FIG. 2 denote the same parts in FIG. 6.

Referring to FIG. 6, the anode of a diode D11 is disconnected from a neutral point e of a secondary winding n2. A connecting point between the anode of the diode D11 and a capacitor C21 is designated by reference symbol o. A DC power supply B for supplying a voltage of $E_0$ V is connected between the neutral point e of the secondary winding n2 and a connecting point g between diodes D12 and D13. The positive terminal of the DC power supply B is connected to the connecting point g, and the negative terminal thereof is connected to the neutral point e.

Assume that the rectangular wave input shown in FIGS. 2(a) to 2(c) is supplied to the circuit having the arrangement described above.

In this circuit, initial charge is performed by the DC power supply B. A capacitor C24 is charged to a voltage of $E_0$ V through the diode D13. A capacitor C25 is charged to a voltage of $E_0$ V by a leakage current from the diode D12. A capacitor C26 is charged to a voltage of $E_0$ V through the diode D13 and diodes D14 and D15. In this case, connecting points h, f and j are set at positive potentials with respect to the capacitors C24, C25 and C26, respectively.

When the phase is shifted to be 180°, as shown in FIGS. 2(a) and 2(b), an output terminal a is set at a voltage of E V, and the diode D12 is turned on. A current then flows through the output terminal a (−E V), the capacitor C25, the connecting point f, the diode D12, the connecting point g, the DC power supply B ($E_0$ V) and the neutral point e, so that the capacitor C25 is charged to a voltage of $(E_0−E)$ V. The connecting point f is set at a positive potential with respect to the capacitor C25. In this case, an output terminal b is set at a voltage of −E V, as shown in FIG. 2(b). The diode D13 is then turned on, so that a current flows through the neutral point e, the DC power supply B ($E_0$ V), the connecting point g, the diode D13, the connecting point h, the capacitor C24 and the output terminal b (−E V), so that the capacitor C24 is charged to a voltage of $(E_0+E)$ V. The connecting point h is set at a positive potential with respect to the capacitor C24. When the phase is shifted to be 300°, the output terminal b is set at a voltage of E V, and the diode D14 is turned on. A current then flows through the output terminal b (E V), the capacitor C24 (($E_0+E$) V), the connecting point h, the diode D14, the connecting point i, the capacitor C22, the connecting point g, the DC power supply B ($-E_0$ V) and the neutral point e, so that the capacitor C22 is charged to a voltage of 2E V. The connecting point i is set at a positive potential with respect to the capacitor C22. In this case, an output terminal c is set at a voltage of $-E$ V, and diodes D34 and D35 are turned on. A current then flows through the output terminal b (E V), the capacitor C24 (($E_0+E$) V), the connecting point h, the diode D14, the connecting point i, the diode D15, the connecting point j, the capacitor C26 and the output terminal c ($-E$ V), so that the capacitor C26 is charged to a voltage of ($E_0+3E$) V. The connecting point j is set at a positive potential with respect by the capacitor C26. When the phase is then shifted to 360°, the output terminal a is set at a voltage of $-E$ V, and the diode D11 is turned on. A current then flows through the neutral point e, the DC power supply B ($-E_0$ V), the connecting point g, the capacitor C21, the connecting point o, the diode D11, the connecting point f, the capacitor C25 (($E_0-E$) V) and the output terminal a ($-E$ V), so that the capacitor C21 is charged to a voltage of 2E V. In this case, the connecting point g is set at a positive potential with respect to the capacitor C21. When the phase is then shifted by 420°, the output terminal c is set at a voltage of E V, and the diode D16 is turned on. A current then flows through the output terminal c (E V), the capacitor C26 (($E_0+3E$) V), the connecting point j, the diode D16, the connecting point k, the capacitor C23, the capacitor C22 ($-2E$ V), the DC power supply B ($-E_0$) and the neutral point e, so that the capacitor C23 is charged to a voltage of 2E V. The connecting point k is set at a positive potential with respect to the capacitor C23. As is apparent from the above description, the connecting points k, i and o are set at voltages of ($E_0+E$), ($E_0+2E$) and ($E_0-2E$) V with reference to ground, respectively.

Substantially the same effects as in the first to third embodiments can be obtained in the fourth embodiment. In addition to these effects, the fourth embodiment has a further advantage in that a voltage can be extracted from the connecting point o, thereby providing positive and negative voltages.

In the first to fourth embodiments, the diodes are biased in one direction. However, the diodes may be biased in the other direction. In this case, the same operations as in the above embodiments can be performed except that the polarities of the capacitors are inverted. In other words, the output voltage has an opposite polarity.

According to the present invention as has been apparent from the above description, a simple multiple step-up rectifier circuit having a small number of component parts can be obtained wherein a higher voltage can be generated even though a transformer having a low dielectric withstand voltage between the primary and secondary windings is used.

What is claimed is:

1. A multiple step-up rectifier circuit comprising:
    transformer means having a primary winding connected to an AC signal source of at least three phases, a star-connected secondary winding having a neutral point connected to ground, and at least three output terminals;
    a series circuit having two terminals and including a plurality of rectifying means connected in series so as to be biased in the same direction;
    a plurality of first capacitor means connected between said two terminals of said series circuit; and
    at least second, third and fourth capacitor means each of which has one end connected to a corresponding one of said output terminals of said secondary winding and the other end connected to a corresponding one of first, second and third connecting points of said rectifying means;
    said neutral point of said secondary winding being connected to one of the connecting points of said first capacitor means or one of said two terminals of said series circuit.

2. A circuit according to claim 1, wherein said first capacitor means has a plurality of capacitors connected in series, said capacitors having connecting points respectively coupled to fourth connecting points of said rectifying means, which exclude the connecting points adjacent to the two terminals of said series circuit.

3. A circuit according to claim 1, wherein each of said first, second, third and fourth capacitor means has a plurality of capacitors, the capacitors of said first capacitor means having connecting points respectively connected to fourth connecting points of said rectifying means, which exclude the connecting points adjacent to the two terminals of said series circuit, the capacitors of said second capacitor means having a connecting point connected to a fifth connecting point of said series circuit, which is not adjacent to said first connecting point, the capacitors of said third capacitor means having a connecting point coupled to a sixth connecting point of said series circuit, which is not adjacent to the second connecting point, and the capacitors of said fourth capacitor means having a connecting point coupled to a seventh connecting point of said series circuit, which is not adjacent to said third connecting point.

4. A circuit according to claim 1, wherein the two terminals of said series circuit constitute output terminals.

5. A circuit according to any one of claims 2 and 3, which further comprises a DC power supply connected between mutual connecting points of said first capacitor means and said neutral point of said second winding of said transformer means.

* * * * *